United States Patent Office 2,907,763
Patented Oct. 6, 1959

2,907,763

4,6-DIAMINO-2-TRICHLOROMETHYLDITHIO-s-TRIAZINE

John F. Hosler, Bound Brook, N.J., assignor to American Cyanamid Company, New York, N.Y., a corporation of Maine No Drawing. Application November 21, 1957
Serial No. 697,768

1 Claim. (Cl. 260—249.8)

This invention relates to a new composition of matter and, more particularly, to a substituted thioammeline derivative which possesses markedly effective biocidal properties. Specifically, the invention is concerned with 4,6-diamino-2-trichloromethyldithio-s-triazine which is characterized by the formula:

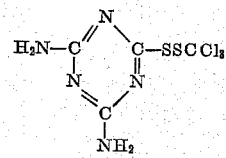

Still more specifically, the invention relates to methods for protecting agricultural, organic and related articles from attack by microorganisms and nematodes.

It has been found that compounded or formulated mixtures containing the above triazine prevent or retard fungus growth on seeds, plants, fruit, fur, leather, cotton and other organic materials. The formulated mixtures may be prepared by incorporating the s-triazine compound of the present invention in a variety of inert carriers or diluents more fully described hereinafter.

The s-triazine ingredient can be prepared by reacting thioammeline with trichloromethanesulfenyl chloride in the presence of an inert solvent. Illustratively, 4,6-diamino-2-trichloromethyldithio-s-triazine can be produced in good yield and purity by heating under reflux 14.3 parts of thioammeline in 88 parts of benzene and 18.6 parts of trichloromethanesulfenyl chloride in 44 parts of benzene, all parts being given by weight. The reaction mixture is refluxed for about seven hours. After the reaction mixture cools to approximately room temperature, the product desired is isolated by filtration, washed with benzene and dried. Upon analysis for $C_4H_4Cl_3N_5S_2$, the following data is obtained:

Calculated: C, 16.4; H, 1.4; Cl, 36.4; N, 23.9 and S, 21.8. Found: C, 16.2; H, 1.45; Cl, 37.7; N, 24.0 and S, 18.7.

In general, the reaction may be carried out under reflux temperatures, depending upon the solvent used. However, for most operations, temperatures of not less than about 80° C. would be employed. Illustrative inert solvents that may be used are characterized as non-hydroxylated organic solvents, such as benzene, acetone, ether and ethyl acetate.

The compound of the present invention may advantageously be applied to plant foliage by the aerosol method. Solutions for this treatment may be prepared either by dissolving the compound prepared directly in a highly volatile liquid carrier such as trichloromethane, or by dissolving the substituted s-triazine in a lesser volatile solvent such as benzene, and then mixing such solution with the highly volatile liquid aerosol carrier.

It is a further advantage of the present invention that the fungicidal compound is effective in dilute concentrations. It is preferred, therefore, to incorporate the substituted s-triazine in a variety of suitable inert liquid or solid carriers or diluents. Such compositions can be prepared either as a suspension in a suitable nonsolvent or as a dust. A suspension or dispersion of the substituted s-triazine in a nonsolvent therefor, such as water, is advantageously prepared for foliage treatment.

The protection of fruits, seeds, plants tubers and the like during storage may be achieved by treating the latter with an aqueous emulsion of the fungicide. An emulsion may be formed by dissolving the compound in an oil and the solution emulsified in water. The oil which can be used as a solvent for the compound of the present invention is a hydrocarbon, as for example benzene, toluene or a halogenated hydrocarbon, such as chlorobenzene, chloroform, fluorotrichloromethane or dichlorodifluoromethane.

Fungicidal dusts may also be prepared by mixing the substituted s-triazines of the present invention with dusting materials as for example clay, pyrophyllite, bentonite, pumice, fuller's earth and the like. Accordingly, seeds can be protected from soil organisms harmful to them by incorporating the present compounds with a solid carrier and mixing the composition with the seed as by tumbling.

The weight range of inert carrier or diluent to fungicidal compound is quite broad and, therefore, not critical. It has been found that up to about 10% of the compound based upon the inert carrier is generally quite adequate. In most cases, however, from about 0.01% to 1% of active ingredient, and preferably about 0.15% is adequate, for aqueous dispersion preparation. As for dust compositions, about 5% of active ingredient is more than satisfactory for most applications.

When the fungicidal compound is employed in aqueous suspensions, the compositions may advantageously contain dispersing agents for the fungicidal compounds. Examples of such dispersing or surface active agents that can be utilized in forming dispersions include: the fatty acid esters of polyhydric alcohols (for example Span), the sodium salt of a polymerized propyl naphthalene sulfonic acid (Daxad 11) and formed by condensing formaldehyde with propyl naphthalene sodium sulfonate, the alkylarylpolyether alcohols (such as Triton X–100), the ethylene oxide addition products of such esters as for example "Tween" and the like. Usually, a good practice is to add from one (1) to about five (5) parts of dispersing agent per 100 parts of the fungicide compound described above.

The invention is further illustrated by the following examples; but it is not to be construed as limited thereto. Unless otherwise stated, the parts given are by weight.

EXAMPLE 1

The toxic agents of the present invention were tested in this example for fungicidal action on spores of *Sclerotinia fructigena* and *Stemphylium sarcinaeforme*, which are both fungae and parasitic on stone fruits and clover, respectively.

These organisms were cultured on potato dextrose agar slants and their spores were readily visible under low-power magnification. Spores were obtained in abundance from 7-day old cultures of *Stemphylium sarcinaeforme* and 14-day old cultures of *Sclerotinia fructigena*. The spores are washed from the agar slant with distilled water and are adjusted to a concentration of approximately 50,000 spores per cc. of water. The s-triazine was dispersed in water in the below-presented concentrations. Aliquots of this dispersion were then placed in separate vials with a definite concentration of spores (50,000 spores per cc. of water). In Run 1 of Table I below, a surface active agent was not added to the mixture. However, in Run 2, one (1) part of Daxad 11 is added to 100 parts of fungicide and mixed prior to dispersing the latter mixture in water. The suspension of spores in toxic agent was then kept mixed in a tumbling machine for a period of 24 hours. At the end of this time, the spores were examined under a microscope for germination. Results of these tests appear in the following table:

*Table I*

| Run No. | Compound | Percent Kill | |
|---|---|---|---|
| | | *Sclerotinia fructigena* in 0.001% conc. | *Stemphylium sarcinaeforme* in 0.01% conc. |
| 1 | 2,6-diamino-2-trichloromethyldithio-s-triazine. | 95 | 95 |
| 2 | Compound of Run 1 and Daxad 11. | 90 | 95 |

EXAMPLE 2

About 24 hours before treatment with an aqueous dispersion of the compound of Example 1, apple tree foliage is inoculated with spores of *Venturia inaequalis*, the fungus which causes a disease known as apple scab. After 24 hours infection period, an aqueous dispersion of the latter substituted triazine derivative (prepared by dispersing one-half part the s-triazine in 800 parts of water) is sprayed on infected apple tree foliage. It is observed that the treatment with the above-mentioned derivative is effective in the eradication of the stated fungus.

EXAMPLE 3

The procedure of Example 2 is repeated except that fungicidal composition comprises one part of s-triazine compound to 800 parts of water. In order to obtain rapid dispersion of the s-triazine compound, 0.01 part of "Daxad" is admixed with the latter. The treatment eradicated the fungus which indicates the effectiveness of the 4,6-diamino-2-trichloromethyldithio-s-triazine derivative as a fungicide.

While the fungicidal composition of the present invention can be used either in a powder or in other inert carriers, a multi-purpose composition may be prepared by adding other active ingredients thereto. Such other active ingredients can be used as the carrier per se. Additionally, an inert carrier may also be present. These active ingredients in admixture can be herbicides, insecticides, fertilizers and the like. Thus, for example, an effective dose of s-triazine toxic agent of the present invention and an insecticide such as DDT suspended in water in the presence of a dispersing agent can be employed as a multi-purpose pesticidal preparation.

The term fungicide as used in this specification and claim is meant to include not only a material having the property of destroying fungi, but also the property of inhibiting the germination of spores of the fungi. It is an advantage of the invention that the compositions of the present invention are commercially suitable for this purpose.

EXAMPLE 4

To illustrate the effectiveness of the nematocidal activity of 4,6-diamino-2-trichloromethyldithio-s-triazine, the 0.01% of the latter compound (by weight) is introduced into a vial containing an aqueous suspension of 100 Anguillula nematodes in 4 cc. of water. The latter is stoppered and rotated for about 20 hours. The percent kill of the nematodes is 100%.

I claim:

4,6-diamino-2-trichloromethyldithio-s-triazine.

No references cited.